(12) United States Patent
Sugimoto et al.

(10) Patent No.: US 7,082,210 B2
(45) Date of Patent: Jul. 25, 2006

(54) MOVING OBJECT DETECTOR AND IMAGE MONITORING SYSTEM

(75) Inventors: Kazuo Sugimoto, Tokyo (JP); Shinichi Kuroda, Tokyo (JP); Fuminobu Ogawa, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 789 days.

(21) Appl. No.: 10/080,691

(22) Filed: Feb. 25, 2002

(65) Prior Publication Data

US 2002/0118862 A1 Aug. 29, 2002

(30) Foreign Application Priority Data

Feb. 28, 2001 (JP) .............................. 2001-054019

(51) Int. Cl.
*G06K 9/00* (2006.01)

(52) U.S. Cl. .................. 382/103; 348/155; 375/240.16

(58) Field of Classification Search ................ 382/100, 382/103, 104, 107; 348/154, 155, 169, 170, 348/171, 172; 73/488
See application file for complete search history.

(56) References Cited

U.S. PATENT DOCUMENTS

| | | | | |
|---|---|---|---|---|
| 5,796,434 A | * | 8/1998 | Lempel | 348/403.1 |
| 6,470,050 B1 | * | 10/2002 | Ohtani et al. | 375/240.16 |
| 6,618,441 B1 | * | 9/2003 | Hasegawa | 375/240.16 |
| 6,842,483 B1 | * | 1/2005 | Au et al. | 375/240.16 |
| 6,901,110 B1 | * | 5/2005 | Tsougarakis et al. | 375/240.12 |
| 6,912,296 B1 | * | 6/2005 | Sim | 382/107 |
| 6,931,146 B1 | * | 8/2005 | Aoki et al. | 382/107 |
| 2001/0021272 A1 | * | 9/2001 | Yamori et al. | 382/236 |

FOREIGN PATENT DOCUMENTS

| | | |
|---|---|---|
| GB | 2 359 954 | 9/2001 |
| JP | 4-119765 A | 4/1992 |
| JP | 4-181872 A | 6/1992 |
| JP | 9-252467 A | 9/1997 |
| JP | 10-294877 A | 11/1998 |
| JP | 11-113002 | 4/1999 |
| JP | 11-284873 A | 10/1999 |

* cited by examiner

*Primary Examiner*—Samir Ahmed
*Assistant Examiner*—Anand Bhatnagar
(74) *Attorney, Agent, or Firm*—Birch, Stewart, Kolasch & Birch, LLP (57) ABSTRACT

A coded stream analyzer (102) variable-length decodes an incoming coded stream and extracts encoding parameters for each macroblock, such as an encoding mode, DCT coefficient values, the amount of codes of DCT coefficients, the amount of codes of each macroblock, and a motion vector, from the coded stream. An effective macroblock identification unit (103) then identifies macroblocks each of which can be contained in a moving object as an effective macroblock by using one or more encoding parameters extracted by the coded stream analyzer (102). A moving object determination unit (104) determines whether or not each of the one or more effective macroblocks identified by the effective macroblock identification unit (103) is contained in a moving object by counting the number of effective macroblocks which are directly adjacent to each of the one or more effective macroblocks or indirectly adjacent to each of the one or more effective macroblocks via one or more other effective macroblocks, and then comparing the number of adjacent effective macroblocks with a predetermined threshold value.

20 Claims, 7 Drawing Sheets

MOVING OBJECT DETECTOR AND IMAGE MONITORING SYSTEM

BACKGROUND OF THE INVENTION

1. Field of the Invention

The present invention relates to a moving object detector for detecting one or more moving objects on a screen by using an encoding parameter and an image monitoring system provided with the moving object detector.

2. Description of the Prior Art

In a prior art image monitoring system intended for crime prevention or disaster prevention using a surveillance camera, an enormous load is put on an observer because the observer should be stationed full time so as to check a monitor or the like at anytime, an enormous load is also put on a transmission path because of constant flow of coded streams through the transmission path, and a large amount of storage used for storing coded streams is needed because the coded streams are stored continuously. Therefore, in the prior art image monitoring system a moving object detector for automatically detecting one or more moving objects is adopted. Japanese patent application publication No. 9-252467 discloses an example as shown in FIG. 11 of such a moving object detector.

Figure 11:
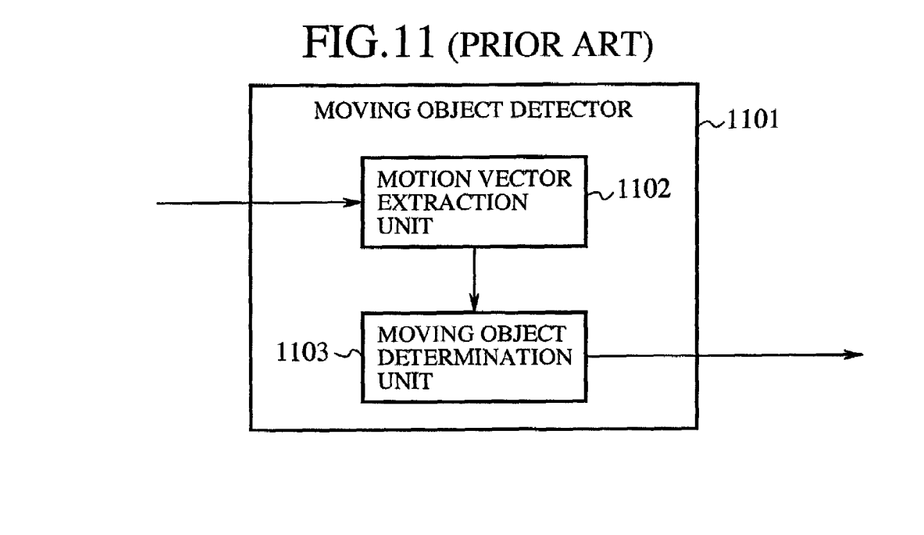
FIG. 11 is a block diagram showing the structure of a prior art moving object detector.

The prior art moving object detector shown in FIG. 11 is disposed on a side of a decoding apparatus, and is provided with a motion vector extraction unit 1102 for extracting a motion vector indicating an amount and direction of movement for each macroblock from a coded stream applied to the decoding apparatus, and a moving object determination unit 1103 for performing statistical processing on the amount and direction of the motion vector for each macroblock, which are extracted by the motion vector extraction unit 1102, and on positions and number of macroblocks associated with the motion vector so as to detect and keep track of one or more moving objects.

However, a problem with the above-mentioned prior art moving object detector is that since a motion vector is not necessarily extracted from each macroblock including a moving object according to an encoding mode determined for each macroblock during encoding of a moving image, it is impossible to accurately detect one or more moving objects by using only motion vectors. Particularly, since in an MPEG-4 video encoding system the moving image is encoded at a low bit rate and with a low resolution in most cases, there may be cases where no motion vector is extracted from a macroblock including a moving object.

Furthermore, a problem with the above-mentioned prior art image monitoring system is that since coded streams are transmitted and stored even when no moving object exists in the monitoring site on the assumption that the observer should be stationed full time so as to check a monitor or the like at anytime and the moving image is continuously stored, an enormous load is put on the transmission path and a large amount of storage used for storing the coded streams is needed.

Another problem is that when a moving object is detected from a stored coded stream, it takes much time to search through the coded stream for data associated with the moving object.

SUMMARY OF THE INVENTION

The present invention is proposed to solve the above-mentioned problems, and it is therefore an object of the present invention to provide a moving object detector that can accurately detect one or more moving objects by changing a criterion used for detection of moving objects according to an encoding mode in which an encoding unit is placed even when in the encoding mode no motion vector is generated, and an image monitoring system that employs the moving object detector.

It is another object of the present invention to provide a moving object detector that can lighten the load put on a transmission path by neither transmitting the coded stream nor storing the coded stream when no moving object exists in the monitoring site, and an image monitoring system that employs the moving object detector.

It is a further object of the present invention to provide a moving object detector that, when it is determined when one or more moving objects exist in the monitoring site, can facilitate searching for a frame at which the one or more moving objects are detected by storing a coded stream which starts from an intra-coded frame together with metadata, and an image monitoring system that employs the moving object detector.

In accordance with an aspect of the present invention, there is provided a moving object detector comprising: an effective macroblock identification unit for identifying one or more candidates for a macroblock that can be contained in an on-screen moving object as one or more effective macroblocks by using an encoding parameter; and a moving object determination unit for determining whether or not each of the one or more effective macroblocks identified by the effective macroblock identification unit is contained in a moving object based on a number of effective macroblocks (referred to as a number of adjacent effective macroblocks from here on) which are directly adjacent to each of the one or more effective macroblocks or indirectly adjacent to each of the one or more effective macroblocks via one or more other effective macroblocks.

In accordance with another aspect of the present invention, the moving object determination unit counts the number of adjacent effective macroblocks for each of the one or more effective macroblocks identified by the effective macroblock identification unit, and, when the number of adjacent effective macroblocks exceeds a predetermined threshold value, determines that a group of plural effective macroblocks directly or indirectly adjacent to one another and including each of the one or more effective macroblocks is a moving object.

In accordance with a further aspect of the present invention, the moving object detector further comprises a coded stream analyzer for analyzing a coded stream obtained by encoding a moving image so as to extract an encoding parameter from the coded stream, and for outputting the encoding parameter to the effective macroblock identification unit.

In accordance with another aspect of the present invention, the moving object detector further comprises an encoding parameter input unit for receiving an encoding parameter generated when a moving image is encoded, and for outputting the encoding parameter to the effective macroblock identification unit.

In accordance with a further aspect of the present invention, the moving object detector further comprises a moving object coordinate-storage unit for storing on-screen coordinates of each effective macroblock which has been determined as a macroblock contained in a moving object by the moving object determination unit, a motion vector storage unit for storing a motion vector for each effective macroblock which has been determined as a macroblock contained in the moving object, and a coordinate calculation unit for calculating a prediction of the on-screen coordinates of each effective macroblock in a next frame based on the on-screen coordinates of each effective macroblock stored in the moving object coordinates storage unit and the motion vector for each effective macroblock stored in the motion vector storage unit. The moving object determination unit then determines whether or not each of the one or more effective macroblocks identified by the effective macroblock identification unit is contained in a moving object by using the one or more effective macroblocks and macroblocks each having a prediction of its on-screen coordinates calculated by the coordinate calculation unit.

In accordance with another aspect of the present invention, the moving object determination unit determines whether or not each of the one or more effective macroblocks identified by the effective macroblock identification unit is contained in a moving object based on the number of adjacent effective macroblocks which are an overlap among a group of plural effective macroblocks directly or indirectly adjacent to one another and including each of the one or more effective macroblocks and the macroblocks each having a prediction of its on-screen coordinates calculated by the coordinate calculation unit.

In accordance with a further aspect of the present invention, the moving object determination unit counts the number of adjacent effective macroblocks which are an overlap among a group of plural effective macroblocks directly or indirectly adjacent to one another and including each of the one or more effective macroblocks and the macroblocks each having a prediction of its on-screen coordinates calculated by the coordinate calculation unit, and then determines whether or not each of the one or more effective macroblocks identified by the effective macroblock identification unit is contained in a moving object based on the counted number of adjacent effective macroblocks.

In accordance with a further aspect of the present invention, the effective macroblock identification unit identifies a macroblock as an effective macroblock that can be contained in a moving object when an encoding mode of the macroblock extracted as the encoding parameter of the macroblock is an intra-coding mode.

In accordance with another aspect of the present invention, the effective macroblock identification unit identifies a macroblock as an effective macroblock that can be contained in a moving object when an encoding mode of the macroblock extracted as the encoding parameter of the macroblock is a motion compensation prediction mode.

In accordance with a further aspect of the present invention, the effective macroblock identification unit identifies a macroblock as an effective macroblock that can be contained in a moving object when a number of DCT coefficients of the macroblock extracted as the encoding parameter of the macroblock is equal to or greater than a predetermined threshold value.

In accordance with another aspect of the present invention, the effective macroblock identification unit identifies a macroblock as an effective macroblock that can be contained in a moving object when a sum of codes of AC components of DCT coefficients of the macroblock extracted as the encoding parameter of the macroblock is equal to or greater than a predetermined threshold value.

In accordance with a further aspect of the present invention, when an encoding mode of a macroblock extracted as the encoding parameter of the macroblock is a motion compensation prediction mode, the effective macroblock identification unit calculates a norm of a motion vector calculated for the macroblock, and identifies the macroblock as an effective macroblock that can be contained in a moving object when the calculated norm is equal to or greater than a predetermined threshold value.

In accordance with a further aspect of the present invention, there is provided an image monitoring system including a moving image decoding unit for receiving a coded stream obtained by encoding an image generated with a camera by way of a transmission path and for decoding the coded stream, and a monitor for displaying the decoded image obtained by the moving image decoding unit, the system comprising: a moving object detector including an effective macroblock identification unit for identifying one or more candidates for a macroblock that can be contained in an on-screen moving object as one or more effective macroblocks by using an encoding parameter, and a moving object determination unit for determining whether or not each of the one or more effective macroblocks identified by the effective macroblock identification unit is contained in a moving object based on a number of effective macroblocks which are directly adjacent to each of the one or more effective macroblocks or indirectly adjacent to each of the one or more effective macroblocks via one or more other effective macroblocks.

In accordance with another aspect of the present invention, when the moving object detector determines that any moving object does not exist in a preceding frame but one or more moving objects exist in a current frame, the moving object detector transmits a signal indicating a request for intra coding to a moving image encoding unit that generates the coded stream by way of the transmission path and the moving image encoding unit then intra-codes following frames of the image when receiving the request signal from the moving object detector.

In accordance with a further aspect of the present invention, the moving image encoding unit intra-codes following frames of the image and also transmits information such as a time and characteristics of the image as metadata by way of the transmission path when receiving the request signal from the moving object detector.

In accordance with another aspect of the present invention, when the moving object detector detects a moving object, the moving object detector outputs information such as a time and characteristics of the image as metadata.

In accordance with a further aspect of the present invention, there is provided an image monitoring system including a camera for generating an image of a monitor point, and a moving image encoding unit for encoding the image generated by the camera and for outputting the encoded image as a coded stream, the system comprising a moving object detector including an effective macroblock identification unit for identifying one or more candidates for a macroblock that can be contained in an on-screen moving object as one or more effective macroblocks by using an encoding parameter; and a moving object determination unit for determining whether or not each of the one or more effective macroblocks identified by the effective macroblock identification unit is contained in a moving object based on a number of effective macroblocks which are directly adjacent to each of the one or more effective macroblocks or indirectly adjacent to each of the one or more effective macroblocks via one or more other effective macroblocks. When the moving object detector detects a moving object, the moving object detector transmits a warning signal by way of a transmission path.

In accordance with a further aspect of the present invention, only when the moving object detector determines that a moving object exists on a screen, the moving image encoding unit transmits the coded stream by way of the transmission path.

In accordance with another aspect of the present invention, when the moving object detector determines that any moving object does not exist in a preceding frame but one or more moving objects exist in a current frame, the moving image encoding unit intra-codes following frames of the image.

In accordance with a further aspect of the present invention, only when the moving object detector determines that a moving object exists on a screen, the moving image encoding unit intra-codes following frames of the image and also transmits information such as a time and characteristics of the image as metadata by way of the transmission path.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
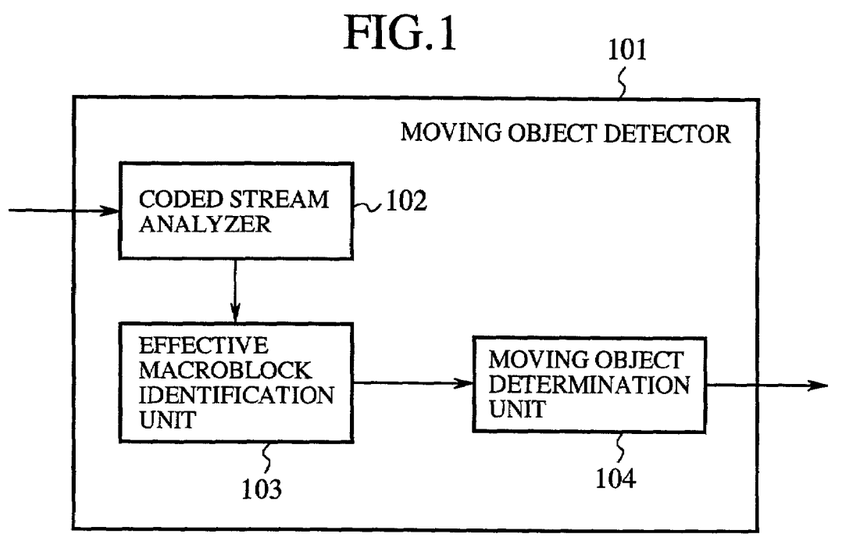
FIG. 1 is a diagram showing the structure of a moving object detector 101 according to a first embodiment of the present invention.

FIG. 1 is a block diagram showing the structure of a moving object detector 101 according to a first embodiment of the present invention. In FIG. 1, reference numeral 102 denotes a coded stream analyzer that receives a coded stream encoded by an encoder (not shown in the figure), analyzes the input coded stream, and extracts encoding parameters for each macroblock from the input coded stream, reference numeral 103 denotes an effective macroblock identification unit for identifying one or more macroblocks each of which becomes a candidate of a macroblock that can be contained in a moving object on a screen by using one or more encoding parameters extracted by the coded stream analyzer 102, and reference numeral 104 denotes a moving object determination unit for determining whether or not each effective macroblock identified by the effective macroblock identification unit 103 is a macroblock contained in a moving object.

In operation, when a coded stream of a moving image is input to the moving object detector 101, the coded stream analyzer 102 performs variable-length decoding on the input coded stream so as to extract encoding parameters for each macroblock, such as an encoding mode, DCT coefficient values, the amount of codes of DCT coefficients, the amount of codes of each macroblock, and a motion vector, from the input coded stream. The coded stream input to the moving object detector 101 can be the one which conforms to any one of all existing moving picture coding methods which use motion compensation predictions and orthogonal transformations, such as ITU-T Recommendation H.261 coding method, ITU-T Recommendation H.263 coding method, the MPEG-1 video coding method, the MPEG-2 video coding method, and the MPEG-4 video coding method, and another moving picture coding method that will be newly designed in the future.

The effective macroblock identification unit 103 identifies one or more macroblocks each of which can be contained in a moving object, as effective macroblocks for the moving object, by using one or more encoding parameters extracted by the coded stream analyzer 102, and outputs the on-screen coordinates of each effective macroblock identified. As a means for identifying effective macroblocks, there is a means for determining that all macroblocks whose encoding mode is intra coding are candidates for a macroblock that can be contained in a moving object because such a macroblock is moving fast and therefore the intra coding mode having a small correlation with a preceding frame has been selected. Furthermore, when the encoding mode of a macroblock is the one, such as the MPEG-4 encoding mode, that provides a motion compensation prediction for each 8 by 8 block, the macroblock can be identified as a candidate for a macroblock that can be contained in a moving object because it is determined that the macroblock is moving fast and therefore the encoding mode that provides a motion compensation prediction for each 8 by 8 block has been selected. Alternatively, the effective macroblock identification unit 103 can calculate a norm (maximum value) of the motion vector for each macroblock, and can then identify each macroblock as a candidate for a macroblock that can be contained in a moving object when the norm is equal to or greater than a predetermined threshold value. As an alternative, the effective macroblock identification unit 103 can identify each macroblock as a candidate for a macroblock that can be contained in a moving object when the number of non-zero DCT coefficients is equal to or greater than a predetermined threshold value or when the sum total of codes of the AC components of the DCT coefficients is equal to or greater than a predetermined threshold value. As an alternative, the effective macroblock identification unit 103 can identify each macroblock as a candidate for a macroblock that can be contained in a moving object when the amount of codes of the DCT coefficients for each macroblock or the amount of codes of the encoding parameters for each macroblock is equal to or greater than a predetermined threshold value. Alternatively, two or more of these identification means can be combined. In other words, any technique of determining whether or not each macroblock is a candidate for a macroblock that can be contained in a moving object using one or more encoding parameters is acceptable.

Figure 2:
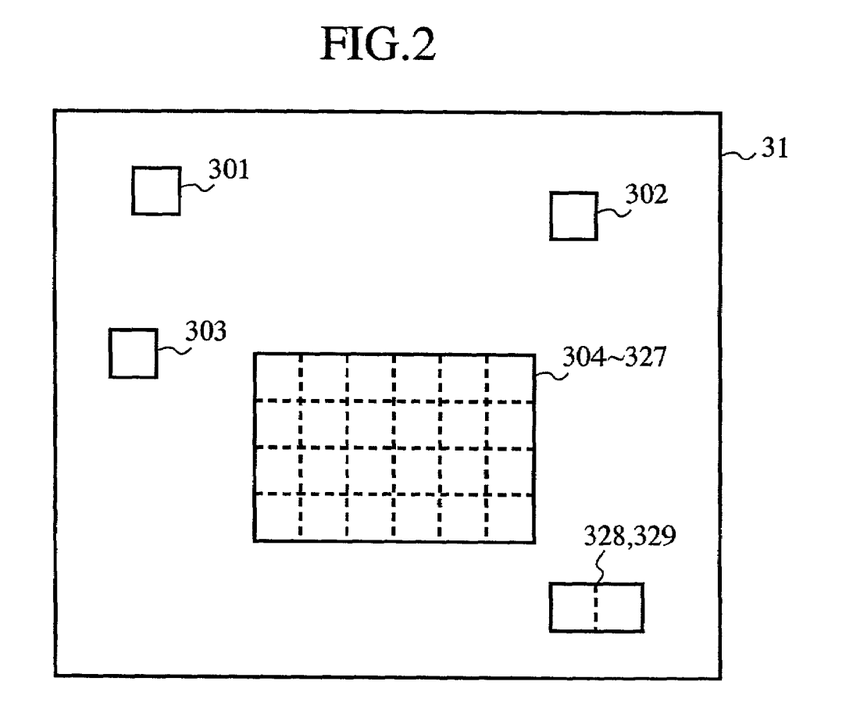
FIG. 2 is a diagram showing an example of effective macroblocks identified by an effective macroblock identification unit 103.

FIG. 2 is a diagram showing an example of effective macroblocks identified by the effective macroblock identification unit 103. In the figure, reference numeral 31 denotes a screen, and reference numerals 301 to 329 denote effective macroblocks, respectively.

Figure 3:
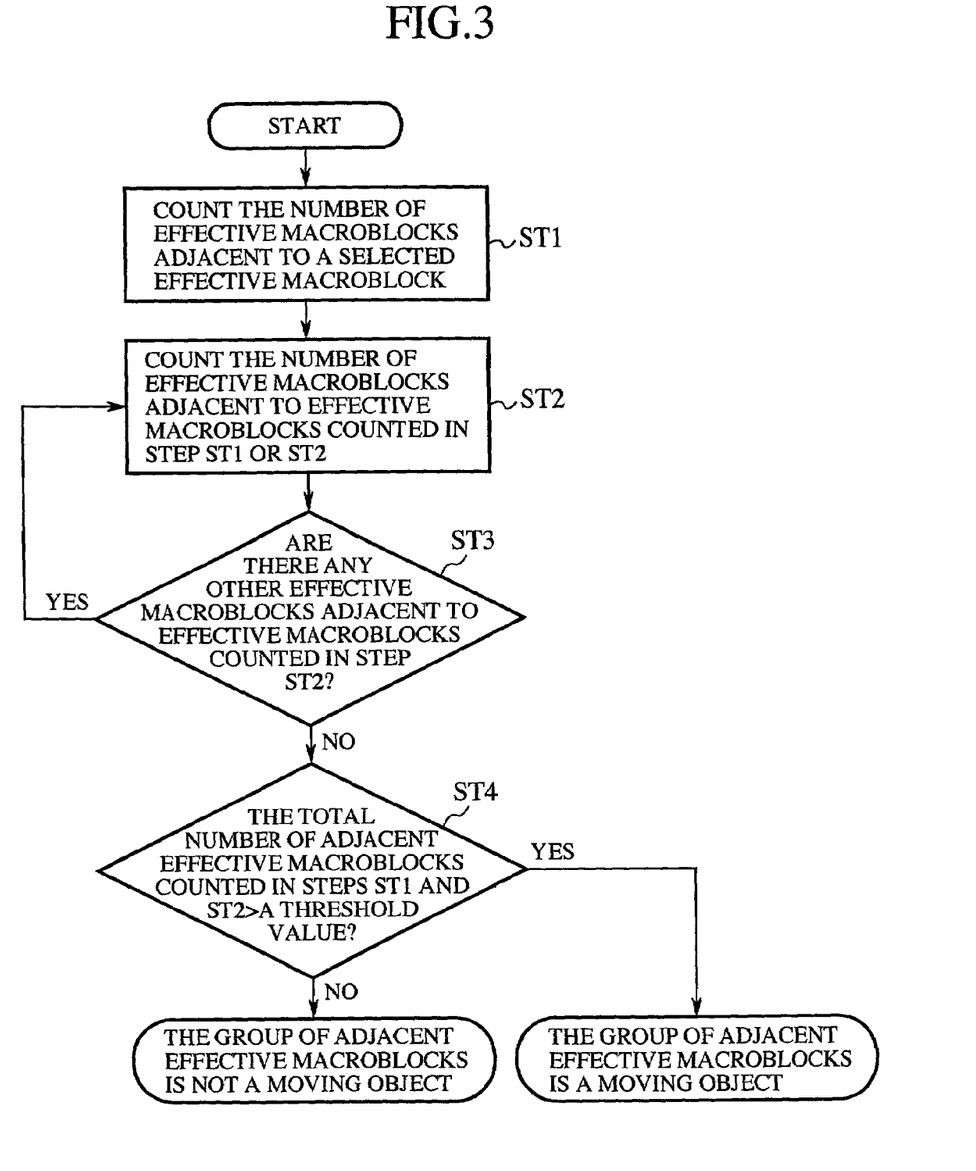
FIG. 3 is a flow chart showing an example of a flow of a determination process of determining whether each effective macroblock is contained in a moving object, which is performed by the moving object detector 101 according to the first embodiment of the present invention.

The moving object determination unit 104 determines whether or not each effective macroblock is contained in a moving object based on information on a position of each effective macroblock identified by the effective macroblock identification unit 103 according to a flow chart as shown, for example, in FIG. 3. FIG. 3 shows an example of the flow of the process of determining whether or not each effective macroblock is contained in a moving object, which is performed by the moving object determination unit 104. First of all, the moving object determination unit 104, in step ST1, counts the number of effective macroblocks (referred to as a number of adjacent effective macroblocks from here on) which are directly adjacent to a selected effective macroblock, and further, in step ST2, counts the number of adjacent effective macroblocks which are indirectly adjacent to the selected effective macroblock via another effective macroblock, i.e., which are adjacent to another effective macroblock already counted in step ST1 or ST2, and which have not been counted yet in steps ST1 and ST2, and adds the counted number in step ST2 to the counted number in step ST1.

The moving object determination unit 104 then repeats the counting of such adjacent effective macroblocks until it performs the counting for all effective macroblocks which are directly or indirectly adjacent to the selected effective macroblock (when "Yes" in step ST3, the moving object determination unit 104 returns to step ST2).

Here, in the case of the example shown in FIG. 2, the number of adjacent effective macroblocks is 0 for each of the effective macroblocks 301 to 303 because there is no effective macroblock which is adjacent to each of the effective macroblocks 301 to 303. In the case of the effective macroblock 304, the number of adjacent effective macroblocks is 23 because the effective macroblocks 305 to 327 which are directly or indirectly adjacent to the effective macroblock 304 are counted in steps ST1 and ST2. In the case of the effective macroblock 328, the number of adjacent effective macroblocks is 1 because the effective macroblock 329 which is directly adjacent to the effective macroblock 328 is counted in step ST1.

When the moving object determination unit 104 completes the counting of the number of adjacent effective macroblocks for the selected effective macroblock (i.e., when "No" in step ST3), the moving object determination unit 104 then, in step ST4, compares the sum total of adjacent effective macroblocks counted in steps ST1 and ST2 for the selected effective macroblock with a predetermined threshold value, and then determines that the region including all counted adjacent effective macroblocks is contained in the region of a moving object when the sum total of adjacent effective macroblocks is equal to or greater than the predetermined threshold value (i.e., when "Yes" instep ST4). In other words, the moving object determination unit 104 determines that the region of the group or cluster including all counted adjacent effective macroblocks is a moving object when the sum total of adjacent effective macroblocks is equal to or greater than the predetermined threshold value.

In contrast, when the sum total of adjacent effective macroblocks is less than the predetermined threshold value (i.e., when "No" in step ST4), the moving object determination unit 104 determines that the region including all counted adjacent effective macroblocks is not contained in the region of any moving object. In other words, when the sum total of adjacent effective macroblocks is less than the predetermined threshold value, the moving object determination unit 104 determines that the region of the group of one or more adjacent effective macroblocks including the selected effective macroblock has been detected due to transmission noise or the like and the region is not a moving object.

For example, in the case of the example shown in FIG. 2, when the predetermined threshold value is 5, the moving object determination unit 104 determines only the region of the group of the effective macroblocks 304 to 327 as the one contained in the region of a moving object, that is, determines that the region of the group of the effective macroblocks 304 to 327 is a moving object. For the sake of simplicity, in the example shown in FIG. 2, only the group of adjacent effective macroblocks 304 to 327 is determined as a moving object. Of course, there is a possibility that two or more groups of adjacent effective macroblocks are determined as moving objects. The moving object determination unit 104 thus repeatedly performs the process of determining moving objects, as shown in FIG. 3, until the counting for each of all the adjacent effective macroblocks on the screen is carried out.

As mentioned above, in accordance with the first embodiment of the present invention, the moving object detector analyzes an incoming coded stream so as to extract a motion vector and other encoding parameters for each macroblock from the coded stream, identifies one or more effective macroblocks based on the acquired motion vector and other encoding parameters, and then determines whether or not there is one or more moving objects by determining whether each identified effective macroblock forms a group of effective macroblocks whose number is equal to or greater than a predetermined threshold value in cooperation with other effective macroblocks which are directly or indirectly adjacent to each effective macroblock in question. Accordingly, the moving object detector can detect one or more moving objects with a high degree of accuracy even when an encoding mode that does not generate a motion vector is selected for encoding each macroblock. The moving object detector can also neglect macroblocks with a large motion vector which are spread on the screen due to transmission noise or the like, so that the moving object detector can detect one or more moving objects at a high speed and with a high degree of accuracy.

The moving object region determination method as shown in FIG. 3 is only an example. Any method of determining one or more moving object regions, limited only by use of effective macroblocks, can be adopted.

Figure 4:
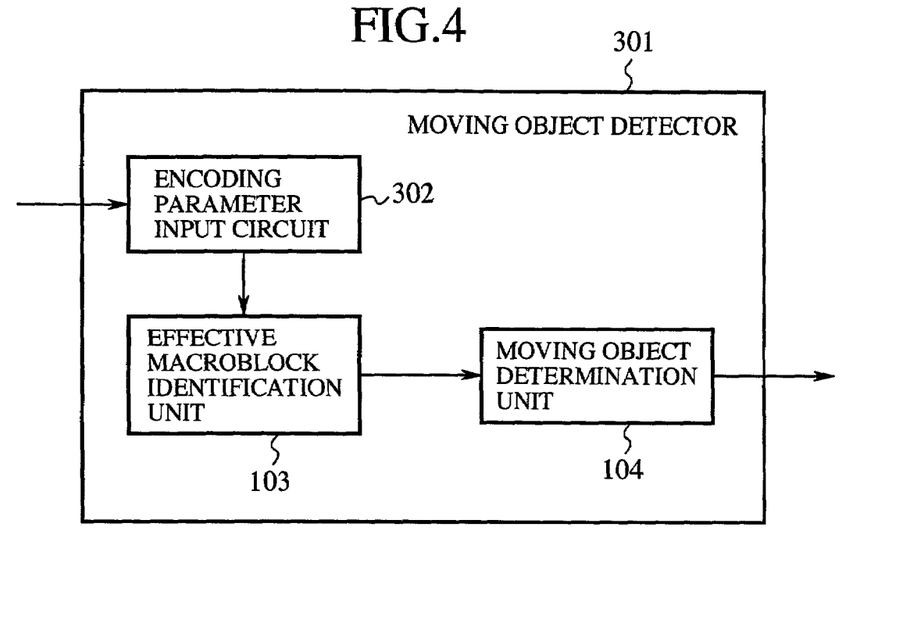
FIG. 4 is a block diagram showing the structure of a moving object detector 101 according to a variant of the first embodiment.

In accordance with the first embodiment mentioned above, as shown in FIG. 1, the coded stream analyzer 102 is so constructed as to receive and analyze a coded stream from a moving picture encoder (not shown in the figure) so as to extract encoding parameters from the coded stream. However, the present embodiment is not limited to the case. In a variant of the first embodiment of the present invention, a moving object detector 301 shown in FIG. 4 can be so constructed as to receive encoding parameters directly from a moving picture encoder (not shown in the figure) by way of an encoding parameter input circuit 302 so as to acquire the encoding parameters. In other words, the moving object detector 101 shown in FIG. 1 is an example of moving object detectors disposed on a side of a moving image decoder, which receives a coded stream from a moving picture encoder by way of a transmission path (not shown in the figure). In contrast, the moving object detector 301 shown in FIG. 4 is an example of moving object detectors disposed on a side of a moving image decoder, which inputs encoding parameters used when a moving image encoder encodes a moving image directly from the moving image encoder.

Embodiment 2

Figure 5:
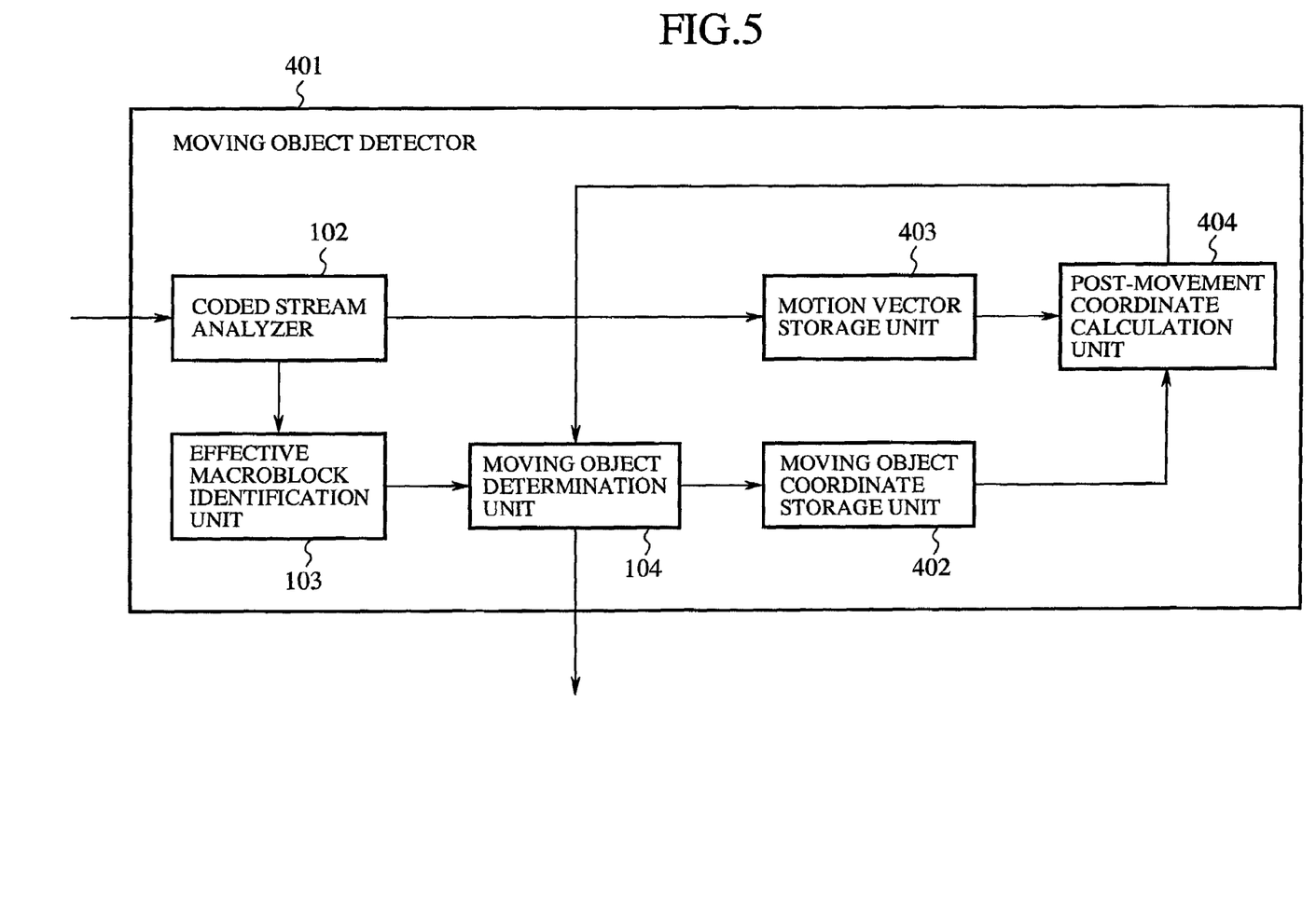
FIG. 5 is a block diagram showing the structure of a moving object detector 401 according to a second embodiment of the present invention.

FIG. 5 is a diagram showing the structure of a moving object detector 401 according to a second embodiment of the present invention. In FIG. 5, reference numeral 402 denotes a moving object coordinate storage unit for storing the on-screen coordinates of each effective macroblock which has been determined as a macroblock contained in a moving object by a moving object determination unit 104, reference numeral 403 denotes a motion vector storage unit for storing a motion vector accompanied by each effective macroblock which has been determined as a macroblock contained in a moving object by the moving object determination unit 104, and reference numeral 404 denotes a post-movement coordinate calculation unit for calculating the position of each moving object which has moved from the on-screen coordinates of macroblocks included in each moving object, which are stored in the moving object coordinates storage unit 402, and the corresponding motion vectors stored in the motion vector storage unit 403. The same reference numerals as shown in FIG. 1 refer to the same components as those of the moving object detector of the first embodiment shown in FIG. 1, respectively, and therefore the explanation of those components will be omitted hereafter.

In the following, an operation specific to the moving object detector of the second embodiment will be explained as compared with the operation of the moving object detector of the first embodiment.

When the moving object determination unit 104 determines that there is one or more moving objects, or there is an effective macroblock contained in a moving object, like that of the moving object detector of the first embodiment, in the moving object detector according to the second embodiment, the moving object coordinate storage unit 402 stores the on-screen coordinates of each effective macroblock which has been determined as a macroblock contained in a moving object by the moving object determination unit 104. Here, the on-screen coordinates of each effective macroblock can be any ones, limited only by a common definition provided for each effective macroblock. For example, the on-screen coordinates of each effective macroblock can be the number of pixels in the horizontal direction and the number of pixels in the vertical direction, both of which are counted from the upper left corner of the screen to a pixel at the center of each effective macroblock.

The motion vector storage unit 403 simultaneously stores a motion vector accompanied by each effective macroblock which has been determined as a macroblock contained in a moving object by the moving object determination unit 104.

The post-movement coordinates calculation unit 404 then calculates a prediction of the on-screen coordinates of each effective macroblock in the next frame which has been determined as a macroblock contained in a moving object based on the on-screen coordinates of each effective macroblock which has been determined as a macroblock contained in the moving object, which are stored in the moving object coordinates storage unit 402, and the corresponding motion vector stored in the motion vector storage unit 403, and outputs the calculated prediction to the moving object determination unit 104.

There is a method of calculating a prediction of the on-screen coordinates of each effective macroblock in the next frame, which the post-movement coordinates calculation unit 404 employs, by adding the corresponding motion vector stored in the motion vector storage unit 403 to the on-screen coordinates of each effective macroblock in the current frame which has been determined as a macroblock contained in a moving object, the on-screen coordinates of each effective macroblock in the current frame being stored in the moving object coordinates storage unit 402. There can be another method of calculating a prediction of the on-screen coordinates of each effective macroblock in the next frame by adding a mean value of the motion vectors of effective macroblocks including each effective macroblock in question, which have been determined as macroblocks contained in a moving object, to the on-screen coordinates of each effective macroblock in the current frame. In other words, the prediction of the on-screen coordinates of each effective macroblock in the next frame can be determined by any technique, limited only by the use of the on-screen coordinates of each effective macroblock in the current frame which has been determined as a macroblock contained in a moving object, and the corresponding motion vector.

The on-screen coordinates thus calculated become a powerful candidate for the position of a moving object in the next frame as long as the moving object is not moving very fast with a sudden movement. In other words, there is a possibility that a macroblock in the current frame which has the post-movement coordinates of an effective macroblock in the preceding frame, which are acquired by the post-movement coordinates calculation unit 404, is an effective macroblock contained in a moving object.

Thus, the moving object determination unit 104 according to the second embodiment determines whether there is one or more moving objects based on effective macroblocks having on-screen coordinates predicted by the post-movement coordinates calculation unit 404 and effective macroblocks identified by the effective macroblock identification unit 103, like that of the first embodiment.

For example, the moving object determination unit 104 can implement a logical AND operation on effective macroblocks having on-screen coordinates predicted by the post-movement coordinates calculation unit 404 and effective macroblocks identified by the effective macroblock identification unit 103, and can perform a moving object determination process shown in FIG. 3 on only effective macroblocks acquired by the logical AND operation, like that of the first embodiment. As a result, the number of groups of effective macroblocks which have to be processed in the moving object determination process shown in FIG. 3 can be reduced, and therefore the moving object determination process can be speeded up.

Figure 6:
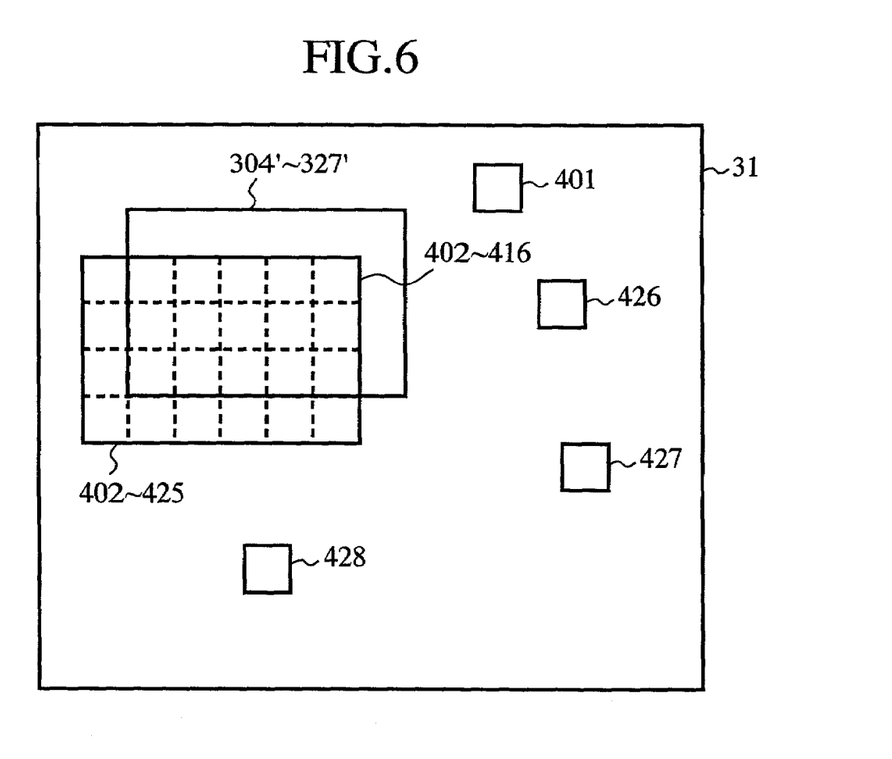
FIG. 6 is a diagram showing a relationship between a prediction of the on-screen coordinates of effective macroblocks estimated from corresponding effective macroblocks in an immediately preceding frame shown in FIG. 2, and the on-screen coordinates of effective macroblocks in a current frame, which are identified by an effective macroblock identification unit.

Concretely, as shown in FIG. 6, the moving object determination unit 104 performs the moving object determination process as shown in FIG. 3 on only effective macroblocks 402 to 416, which correspond to a logical AND operation result of a prediction of the on-screen coordinates of effective macroblocks 304' to 327' estimated from effective macroblocks 304 to 327 in the immediately preceding frame shown in FIG. 2, for example, and the on-screen coordinates of effective macroblocks 402 to 425 in the current frame, which are identified by the effective macroblock identification unit 103, without performing the moving object determination process as shown in FIG. 3 on effective macroblocks 401 and 426 to 428, thus speeding up the moving object determination process. As a result, according to this moving object determination process, the macroblocks 402 to 425 are counted as effective macroblocks which are directly or indirectly adjacent to each of them.

As an alternative, after the moving object determination unit 104 implements a logical AND operation on effective macroblocks having on-screen coordinates predicted by the post-movement coordinates calculation unit 404 and effective macroblocks identified by the effective macroblock identification unit 103, the moving object determination unit 104 can perform the moving object determination process in consideration with the movement of each effective macroblock in the immediately preceding frame, thereby improving the accuracy of determination of moving objects.

Concretely, as shown in FIG. 6, the moving object determination unit 104 performs the moving object determination process as shown in FIG. 3 on only the effective macroblocks 402 to 416, which correspond to the logical AND operation result of the prediction of the on-screen coordinates of the effective macroblocks 304' to 327' estimated from the effective macroblocks 304 to 327 in the immediately preceding frame shown in FIG. 2, for example, and the on-screen coordinates of the effective macroblocks 402 to 425 in the current frame, which are identified by the effective macroblock identification unit 103, so that the moving object determination unit 104 counts the number of effective macroblocks 402 to 416 which are directly or indirectly adjacent to each of them, thus improving the accuracy of determination of moving objects. As a result, according to this moving object determination process, only the macroblocks 402 to 416 are counted as effective macroblocks which are directly or indirectly adjacent to each of them.

As mentioned above, in accordance with the second embodiment of the present invention, the moving object detector identifies one or more effective macroblocks and then determines whether or not there is one or more moving objects by determining whether each identified effective macroblock forms a group of effective macroblocks whose number is equal to or greater than a predetermined threshold value in cooperation with other effective macroblocks which are directly or indirectly adjacent to each effective macroblock in question, like that of the above-mentioned first embodiment. Accordingly, the moving object detector can detect one or more moving objects with a high degree of accuracy even when an encoding mode that does not generate a motion vector is selected for encoding each macroblock. The moving object detector can also neglect macroblocks with a large motion vector which are spread on the screen due to transmission noise or the like, so that the moving object detector can detect one or more moving objects at a high speed and with a high degree of accuracy.

Furthermore, in accordance with the second embodiment, the moving object determination unit 104 determines whether or not there is one or more moving objects based on a prediction of the on-screen coordinates of each effective macroblock in the immediately preceding frame which has been determined as a macroblock contained in a moving object, and the on-screen coordinates of each effective macroblock in the current frame identified by the effective macroblock identification unit 103. Accordingly, the moving object determination process can be carried out at a high speed and with a high degree of accuracy.

Figure 7:
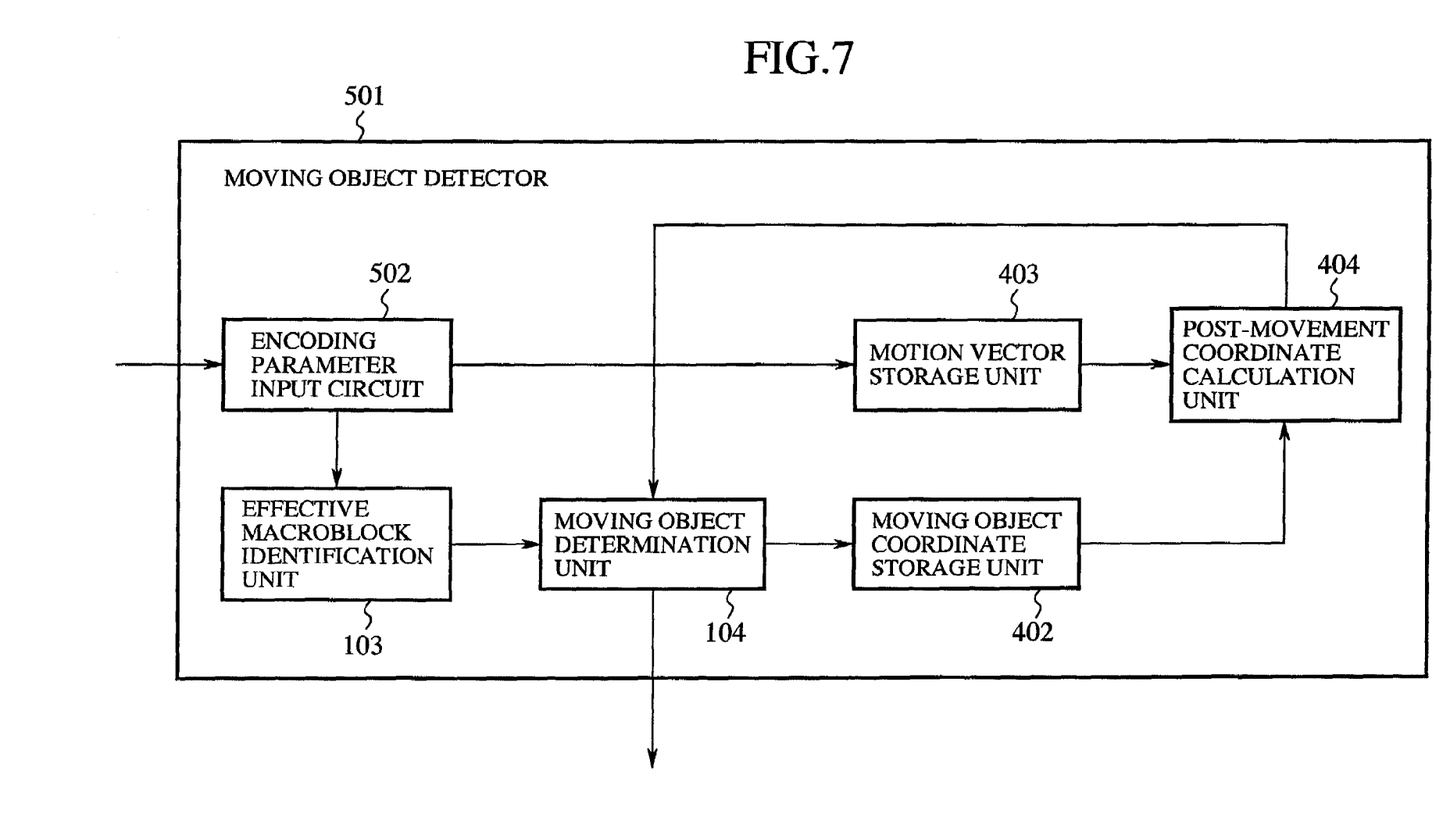
FIG. 7 is a block diagram showing the structure of a moving object detector 401 according to a variant of the second embodiment of the present invention.

In a variant of the second embodiment, instead of extracting encoding parameter by analyzing the incoming coded stream, a moving object detector 501 shown in FIG. 7 receives encoding parameters directly from a moving image encoding unit (not shown in the figure) by way of an encoding parameter input circuit 502. In other words, the moving object detector 401 shown in FIG. 5 is an example of moving object detectors disposed on a side of a moving image decoder, which receives a coded stream from a moving picture encoder by way of a transmission path (not shown in the figure). In contrast, the moving object detector 501 shown in FIG. 7 is an example of moving object detectors disposed on a side of a moving image decoder, which inputs encoding parameters used when a moving image encoder encodes a moving image directly from the moving image encoder.

Furthermore, in the above-mentioned second embodiment, a prediction of the on-screen coordinates of each effective macroblock in the immediately preceding frame that has been determined as a macroblock contained in a moving object, as shown in FIGS. 5 and 7, is input to the moving object determination unit 104 from the post-movement coordinate calculation unit effective macroblock from 404. The present invention is not limited to the case. As an alternative, the moving object determination unit 104 can receive the prediction of the on-screen coordinates of each effective macroblock predicted by the post-movement coordinates calculation unit 404 so as to implement a logical AND operation on effective macroblocks having on-screen coordinates predicted by the post-movement coordinates calculation unit 404 and effective macroblocks identified by the effective macroblock identification unit 103, and then output a logical AND operation result to the moving object determination unit 104.

Embodiment 3

Figure 8:
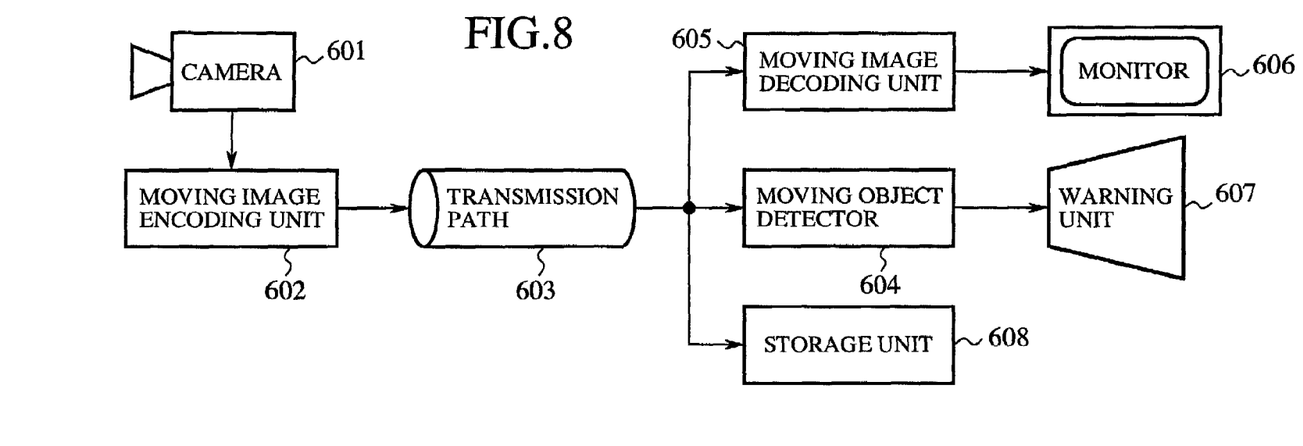
FIG. 8 is a block diagram showing the structure of an image monitoring system according to a third embodiment of the present invention.

FIG. 8 is a block diagram showing the structure of an image monitoring system according to a third embodiment of the present invention. In the figure, reference numeral 601 denotes a camera for capturing an image of a monitoring site, reference numeral 602 denotes a moving image encoding unit for encoding an image captured by the camera 601, reference numeral 603 denotes a transmission path, such as the Internet, via which a coded stream encoded by the moving image encoding unit 602 is transmitted to a monitor room, reference numeral 604 denotes a moving object detector according to any one of the above-mentioned first and second embodiments, reference numeral 605 denotes a moving image decoding unit for decoding a coded stream received by way of the transmission path 603, reference numeral 606 denotes a monitor for displaying an image decoded by the moving image decoding unit 605, reference numeral 607 denotes a warning unit for generating a warning sound, warning light, a warning signal, or the like when one or more moving objects are detected by the moving object detector 604, and reference numeral 608 denotes a storage unit for storing coded streams.

In operation, the camera 601 is fixedly or movably directed to the monitoring site and always captures an image of the monitoring site so as to supply the image to the moving image encoding unit 602.

The moving image encoding unit 602 encodes the moving image supplied from the camera 601 and transmits a coded stream by way of the transmission path 603. The coded stream transmitted by way of transmission path 603 is input to the moving object detector 604, the moving image decoding unit 605, and the storage unit 608 disposed on a receiver side, i.e., a decoder side.

The moving object detector 604 then analyzes the input coded stream so as to determine whether or not there is one or more moving objects in the moving image, and outputs a determination result to the warning unit 607. In other words, since the moving object detector 604 needs to analyze the coded stream in the case of the image monitoring system shown in FIG. 8, the moving object detector 604 can be either a moving object detector 101 according to the first embodiment shown in FIG. 1 or a moving object detector 401 according to the second embodiment shown in FIG. 5.

Then, the warning unit 607 emits a warning sound, warning light, a warning signal, or the like so as to notify an observer of the detection of moving objects when one or more moving objects have been detected by the moving object detector 604.

The moving image decoding unit 605 then decodes the coded stream transmitted thereto by way of the transmission path 603, and outputs the decoded stream to the monitor 606 as an image signal. The monitor 606 displays the corresponding moving image so as to allow the observer to keep a watch on the monitoring site.

The storage unit 608 stores the coded stream at all times so as to allow reproduction of the corresponding moving image at anytime by the monitor 606 or the like.

Therefore, in accordance with the third embodiment, the observer can be allowed to discover an intruder to the monitoring site by observing the monitor 606 only when the observer is notified of detection of the intruder from the warning unit 607 without having to keep a watch on the monitor 606 at anytime, and therefore the load imposed on the observer can be reduced significantly.

Figure 9:
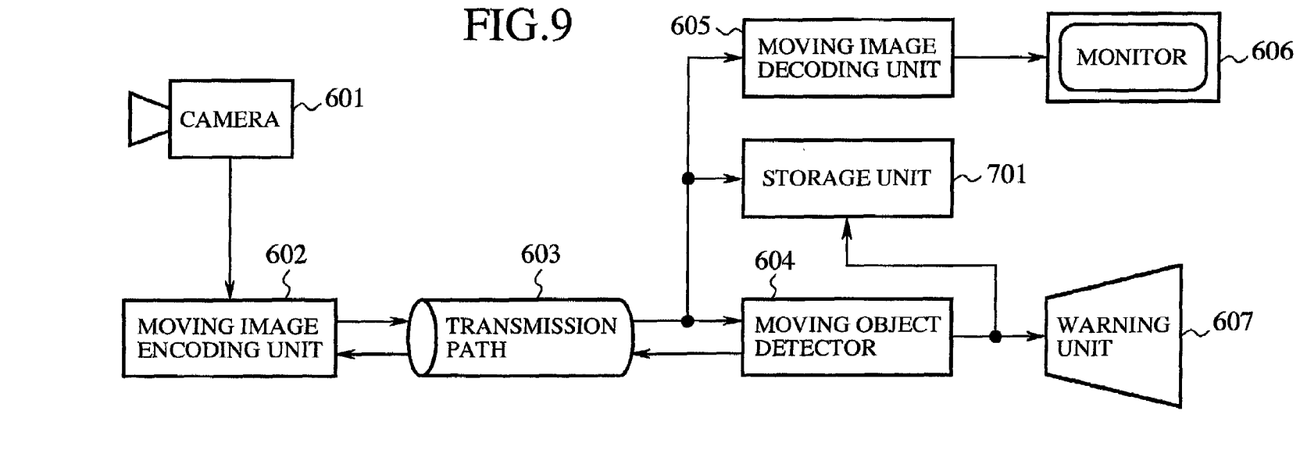
FIG. 9 is a block diagram showing the structure of an image monitoring system according to a variant of the third embodiment of the present invention.

Furthermore, as shown in FIG. 9, when the moving object detector 604 discovers an intruder or the like as a moving object, the moving object detector 604 can send a signal indicating a request for intra coding to the moving image encoding unit 602 byway of the transmission path 603, and the moving image encoding unit 602 can intra-code following frames when receiving the intra coding request signal. Thus, when an intruder or the like is discovered by the moving object detector 604, a coded stream, which starts from an intra-coded frame, can be stored in the storage unit 701, and it is therefore easy to extract only the frame at which an intruder or the like is discovered.

Furthermore, instead of or in addition to transmitting the intra coding request signal to the moving image encoding unit 602, it is also possible to transmit a signal indicating a request for a change in an encoding parameter, such as a quantization step, and then store an image with a lower compression rate than usual, i.e., a higher resolution and higher definition in the storage unit 701 when a moving object such as an intruder is discovered. Thus, instead of or in addition to extraction of the frame at which a moving object such as an intruder is discovered, an image with a high compression rate is stored when any moving object, such as an intruder, is not discovered, whereas when a moving object, such as an intruder, is discovered, the moving object can be confirmed with a clear image with a low compression rate.

Furthermore, as shown in FIG. 9, at the same time that a coded stream which starts from an intra-coded frame is stored when one or more moving objects are detected, the moving object detector 604 can output information such as a time and characteristics of the image to the storage unit 701 as metadata so as to store the metadata in the storage unit 701 together with the coded stream which starts from the intra-coded frame. Accordingly, when a coded stream which starts from an intra-coded frame is thus recorded together with its metadata, the present embodiment offers an advantage of being able to easily locate the start of the recorded sequence, for example, when reproducing a corresponding moving image when a moving object, such as an intruder, is discovered, and hence to easily search for the frame at which the moving object is discovered, by referring to the metadata stored in the storage unit. Metadata can be transmitted from the moving image encoding unit 602 other than the moving object detector 604, by way of the transmission path 603, to the storage unit 701.

The storage unit 701 does not have to store the coded stream from the moving image encoding unit 602 at all times, but can alternatively store the coded stream from the moving image encoding unit 602 in response to the metadata from the moving object detector 604 or the moving image encoding unit 602. Since the coded stream is thus stored in the storage unit 701 after one or more moving objects have been detected or only while one or more moving objects are detected, the amount of storage used in the storage unit 701 can be reduced compared with that provided by prior art techniques and therefore exhaustion of storage such as a tape can be prevented.

Embodiment 4

Figure 10:
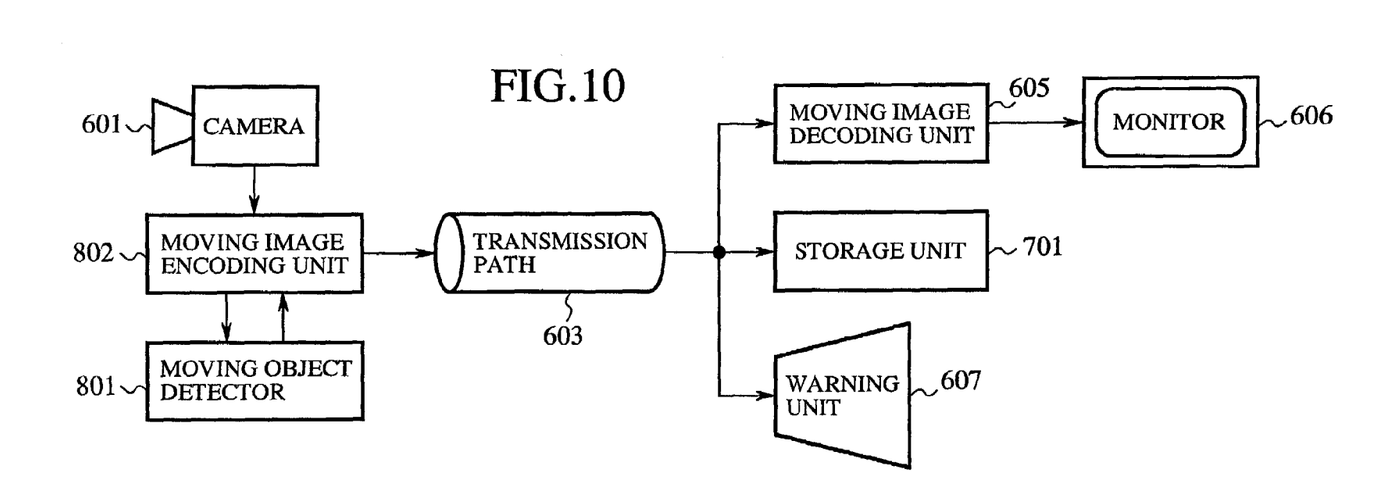
FIG. 10 is a block diagram showing the structure of an image monitoring system according to a fourth embodiment of the present invention.

FIG. 10 is a block diagram showing the structure of an image monitoring system according to a fourth embodiment of the present invention. In the figure, reference numeral 801 denotes a moving object detector according to any one of the first and second embodiments of the present invention, and reference numeral 802 denotes a moving picture encoding unit that operates based on a captured image from a camera 601 and a detection result from a moving object detector 801. The other structure of the image monitoring system according to the fourth embodiment of the present invention is the same as that of the above-mentioned third embodiment as shown in FIGS. 8 and 9 and the same reference numerals refer to the same components, and therefore the explanation of those components will be omitted hereafter.

In operation, the camera 601 is fixedly or movably directed to a monitoring site and always captures an image of the monitoring site so as to supply the image to a moving image encoding unit 802. The moving image encoding unit 802 encodes the moving image supplied from the camera 601, and extracts encoding parameters from a coded stream and then transmits them to the moving object detector 801. The moving image encoding unit 802 also transmits the encoding parameters to a moving image decoding unit 605 by way of a transmission path 603.

The moving object detector 801 then analyzes the input encoding parameters so as to determine whether or not there is one or more moving objects in the moving image, like that of either of the first and second embodiments, and outputs a determination result to the moving image encoding unit 802.

In other words, since the moving object detector 801 is disposed on the encoder side and does not need to analyze the coded stream in the case of the image monitoring system shown in FIG. 10, the moving object detector 802 can be either a moving object detector 301 according to the first embodiment shown in FIG. 4 or a moving object detector 501 according to the second embodiment shown in FIG. 7.

When the moving image encoding unit 802 receives the determination result indicating detection of moving objects from the moving object detector 801, the moving image encoding unit 802 transmits a warning signal indicating the detection of moving objects to the moving image decoding unit 605 by way of the transmission path 603.

The moving image decoding unit 605 then decodes the coded stream transmitted thereto by way of the transmission path 603, and outputs the decoded stream to a monitor 606 so as to reproduce the captured image. A warning unit 607 emits a warning sound, warning light, a warning signal, or the like based on the warning signal from the moving image encoding unit 802.

Therefore, in accordance with the fourth embodiment, an observer can be allowed to discover an intruder to the monitoring site by observing the monitor 606 only when the observer is notified of detection of the intruder from the warning unit 607 without having to keep a watch on the monitor 606 at anytime, and therefore the load imposed on the observer can be reduced significantly.

Since the moving image encoding unit 802 of the fourth embodiment is so constructed as not to transmit the coded stream to the moving image decoding unit 605 by way of the transmission path 603 when the moving object detector 801 determines that there is no moving object at the monitoring site, the coded stream flows through the transmission path 603 only when one or more moving objects, such as an intruder, are detected and therefore the load imposed on the transmission path 603 can be reduced.

Furthermore, even in the fourth embodiment, when the moving object detector 801 determines that there is one or more moving objects at the monitoring site, the moving image encoding unit 802 can intra-code following frames, and a storage unit can therefore store a coded stream, which starts from an intra-coded frame, when one or more moving objects are discovered at the monitoring site.

Furthermore, at the same time that a coded stream which starts from an intra-coded frame is stored when one or more moving objects are discovered at the monitoring site, the moving object detector 801 can output information such as a time and characteristics of the image to the storage unit 701 as metadata so as to store the metadata in the storage unit 701 together with the coded stream which starts from the intra-coded frame. Accordingly, as previously explained in the third embodiment, when the moving object detector 801 detects an intruder at the monitoring site, a coded stream which starts from an intra-coded frame is stored in the storage unit 701 together with its metadata, and therefore an observer can easily extract only the frame at which the intruder is discovered, by referring to the metadata stored in the storage unit. When the moving object detector 801 determines that there is one or more moving objects at the monitoring site, the moving image encoding unit 802 can perform encoding with a lower compression rate than usual, i.e., a higher resolution and higher definition on the image by changing an encoding parameter, such as a quantization step, prior to the discovery of the one or more moving objects so as to generate a coded stream and output it to the decoder side by way of the transmission path 603. Therefore any intruder can be confirmed with a clear image while the observer can easily extract only the frame at which the intruder is discovered, by referring to the metadata stored in the storage unit.

Metadata can be transmitted from the moving image encoding unit 802 other than the moving object detector 801, by way of the transmission path 603, to the storage unit 701. In this case, since the storage unit 701 can store the coded stream from the moving image encoding unit 802 while one or more moving objects are detected, the amount of storage used in the storage unit 701 can be reduced compared with that provided by prior art techniques. In addition, when a coded stream which starts from an intra-coded frame is recorded together with its metadata, the present embodiment offers an advantage of, when reproducing a corresponding moving image when a moving object, such as an intruder, is discovered, being able to easily search for the frame at which the moving object is discovered, and to easily locate the start of the recorded sequence.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moving object detector comprising:
    an effective macroblock identification unit for identifying one or more candidates for a macroblock that can be contained in an on-screen moving object as one or more effective macroblocks by using an encoding parameter; and
    a moving object determination unit for determining whether or not each of the one or more effective macroblocks identified by said effective macroblock identification unit is contained in a moving object based on a number of effective macroblocks which are directly adjacent to each of the one or more effective macroblocks or indirectly adjacent to each of the one or more effective macroblocks via one or more other effective macroblocks.

2. The moving object detector according to claim 1, wherein said moving object determination unit counts the number of adjacent effective macroblocks for each of the one or more effective macroblocks identified by said effective macroblock identification unit, and, when the number of adjacent effective macroblocks exceeds a predetermined threshold value, determines that a group of plural effective macroblocks directly or indirectly adjacent to one another and including each of the one or more effective macroblocks is a moving object.

3. The moving object detector according to claim 1, further comprising a coded stream analyzer for analyzing a coded stream obtained by encoding a moving image so as to extract an encoding parameter from the coded stream, and for outputting the encoding parameter to said effective macroblock identification unit.

4. The moving object detector according to claim 1, further comprising an encoding parameter input unit for receiving an encoding parameter generated when a moving image is encoded, and for outputting the encoding parameter to said effective macroblock identification unit.

5. The moving object detector according to claim 1, further comprising a moving object coordinate storage unit for storing on-screen coordinates of each effective macroblock which has been determined as a macroblock contained in a moving object by said moving object determination unit, a motion vector storage unit for storing a motion vector for each effective macroblock which has been determined as a macroblock contained in the moving object, and a coordinate calculation unit for calculating a prediction of the on-screen coordinates of each effective macroblock in a next frame based on the on-screen coordinates of each effective macroblock stored in said moving object coordinates storage unit and the motion vector for each effective macroblock stored in said motion vector storage unit, wherein said moving object determination unit determines whether or not each of the one or more effective macroblocks identified by the effective macroblock identification unit is contained in a moving object by using the one or more effective macroblocks and macroblocks each having a prediction of its on-screen coordinates calculated by said coordinate calculation unit.

6. The moving object detector according to claim 5, wherein said moving object determination unit determines whether or not each of the one or more effective macroblocks identified by the effective macroblock identification unit is contained in a moving object based on the number of adjacent effective macroblocks which are an overlap among a group of plural effective macroblocks directly or indirectly adjacent to one another and including each of the one or more effective macroblocks and the macroblocks each having a prediction of its on-screen coordinates calculated by said coordinate calculation unit.

7. The moving object detector according to claim 5, wherein said moving object determination unit counts the number of adjacent effective macroblocks which are an overlap among a group of plural effective macroblocks directly or indirectly adjacent to one another and including each of the one or more effective macroblocks and the macroblocks each having a prediction of its on-screen coordinates calculated by said coordinate calculation unit, and then determines whether or not each of the one or more effective macroblocks identified by the effective macroblock identification unit is contained in a moving object based on the counted number of adjacent effective macroblocks.

8. The moving object detector according to claim 1, wherein said effective macroblock identification unit identifies a macroblock as an effective macroblock that can be contained in a moving object when an encoding mode of the macroblock extracted as the encoding parameter of the macroblock is an intra coding mode.

9. The moving object detector according to claim 1, wherein said effective macroblock identification unit identifies a macroblock as an effective macroblock that can be contained in a moving object when an encoding mode of the macroblock extracted as the encoding parameter of the macroblock is a motion compensation prediction mode.

10. The moving object detector according to claim 1, wherein said effective macroblock identification unit identifies a macroblock as an effective macroblock that can be contained in a moving object when a number of DCT coefficients of the macroblock extracted as the encoding parameter of the macroblock is equal to or greater than a predetermined threshold value.

11. The moving object detector according to claim 1, wherein said effective macroblock identification unit identifies a macroblock as an effective macroblock that can be contained in a moving object when a sum of codes of AC components of DCT coefficients of the macroblock extracted as the encoding parameter of the macroblock is equal to or greater than a predetermined threshold value.

12. The moving object detector according to claim 1, wherein when an encoding mode of a macroblock extracted as the encoding parameter of the macroblock is a motion compensation prediction mode, said effective macroblock identification unit calculates a norm of a motion vector calculated for the macroblock, and identifies the macroblock as an effective macroblock that can be contained in a moving object when the calculated norm is equal to or greater than a predetermined threshold value.

13. An image monitoring system including a moving image decoding unit for receiving a coded stream obtained by encoding an image generated with a camera by way of a transmission path and for decoding the coded stream, and a monitor for displaying the decoded image obtained by said moving image decoding unit, said system comprising:

a moving object detector including an effective macroblock identification unit for identifying one or more candidates for a macroblock that can be contained in an on-screen moving object as one or more effective macroblocks by using an encoding parameter, and a moving object determination unit for determining whether or not each of the one or more effective macroblocks identified by said effective macroblock identification unit is contained in a moving object based on a number of effective macroblocks which are directly adjacent to each of the one or more effective macroblocks or indirectly adjacent to each of the one or more effective macroblocks via one or more other effective macroblocks.

14. The image monitoring system according to claim 13, wherein when said moving object detector determines that any moving object does not exist in a preceding frame but one or more moving objects exist in a current frame, said moving object detector transmits a signal indicating a request for intra coding to a moving image encoding unit that generates the coded stream by way of the transmission path and said moving image encoding unit then intra-codes following frames of the image when receiving the request signal from said moving object detector.

15. The image monitoring system according to claim 14, wherein said moving image encoding unit intra-codes following frames of the image and also transmits information such as a time and characteristics of the image as metadata by way of the transmission path when receiving the request signal from said moving object detector.

16. The image monitoring system according to claim 14, wherein when said moving object detector detects a moving object, said moving object detector outputs information such as a time and characteristics of the image as metadata.

17. An image monitoring system including a camera for generating an image of a monitor point, and a moving image encoding unit for encoding the image generated by said camera and for outputting the encoded image as a coded stream, said system comprising:

a moving object detector including an effective macroblock identification unit for identifying one or more candidates for a macroblock that can be contained in an on-screen moving object as one or more effective macroblocks by using an encoding parameter; and a moving object determination unit for determining whether or not each of the one or more effective macroblocks identified by said effective macroblock identification unit is contained in a moving object based on a number of effective macroblocks which are directly adjacent to each of the one or more effective macroblocks or indirectly adjacent to each of the one or more effective macroblocks via one or more other effective macroblocks, wherein when said moving object detector detects a moving object, said moving object detector transmits a warning signal by way of a transmission path.

18. The image monitoring system according to claim 17, wherein only when said moving object detector determines that a moving object exists on a screen, said moving image encoding unit transmits the coded stream by way of the transmission path.

19. The image monitoring system according to claim 17, wherein when said moving object detector determines that any moving object does not exist in a preceding frame but one or more moving objects exist in a current frame, said moving image encoding unit intra-codes following frames of the image.

20. The image monitoring system according to claim 17, wherein only when said moving object detector determines that a moving object exists on a screen, said moving image encoding unit intra-codes following frames of the image and also transmits information such as a time and characteristics of the image as metadata by way of the transmission path.

* * * * *